J. D. O'DONNELL'S IMPROVEMENT IN SODA WATER APPARATUS.

Scale ¼th

No. 117805

Patented Aug 8 1871

117,805

UNITED STATES PATENT OFFICE

JAMES D. O'DONNELL, OF WASHINGTON, DISTRICT OF COLUMBIA.

IMPROVEMENT IN APPARATUS FOR GENERATING CARBONIC-ACID GAS.

Specification forming part of Letters Patent No. 117,805, dated August 8, 1871.

*To all whom it may concern:*

Be it known that I, JAMES D. O'DONNELL, of the city of Washington and District of Columbia, have invented new and useful Improvements in Apparatus for the Generation of Carbonic-Acid Gas in the Manufacture of Soda-Water, of which the following is a specification:

The nature of my invention consists in so constructing the generator and acid-chamber that, on account of the simplicity of the arrangement, a great saving in cost of material and workmanship is effected, and in the use of an acid-valve operated horizontally by means of handle at top of valve-stem, and requiring two half-turns of handle—say, one from right to left, and one back again to original position—for each operation of the valve, the valve resting in seat, and not being raised therefrom by means of thread raised on stem of same working into nut, or in any other manner; and in the use of a small pipe, securely attached to end of valve-stem, and terminating in funnel at lower end near the bottom of generator, through which the acid is emptied on alkaline mixture at bottom of generator, whereby all the work of an agitator is performed.

In order that those skilled in the art of manufacturing may be able to construct the same, I will give a faithful and explicit description of it, reference being had to the accompanying drawing, of which—

Figure 1:
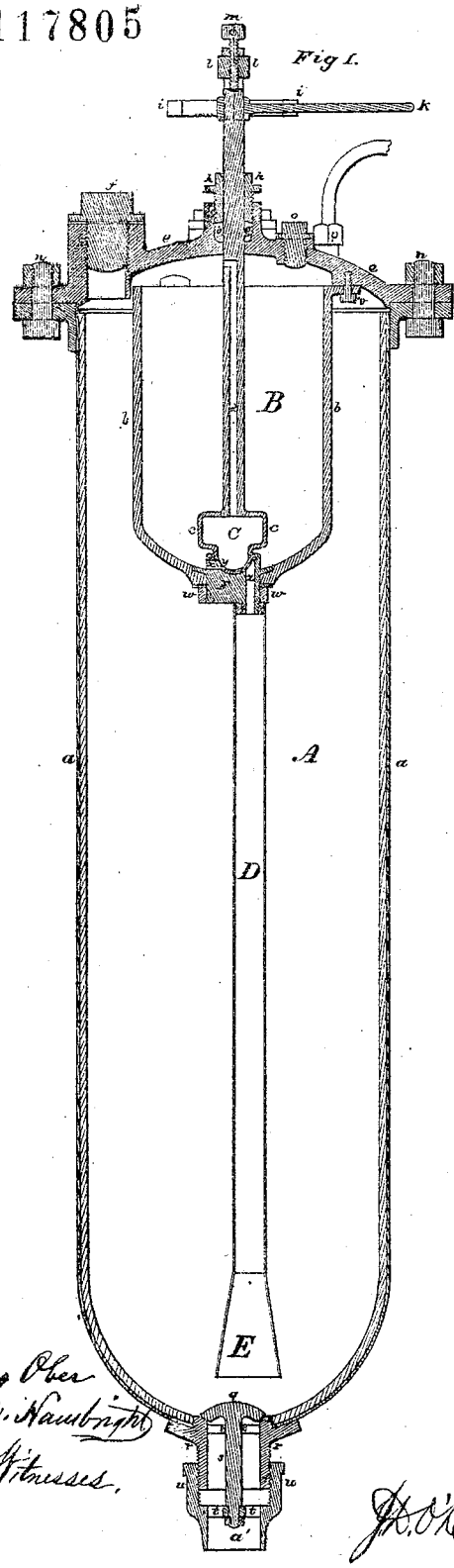
Figure 2:
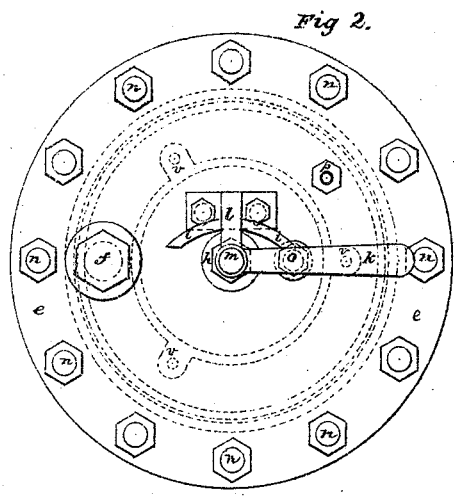
Figure 3:
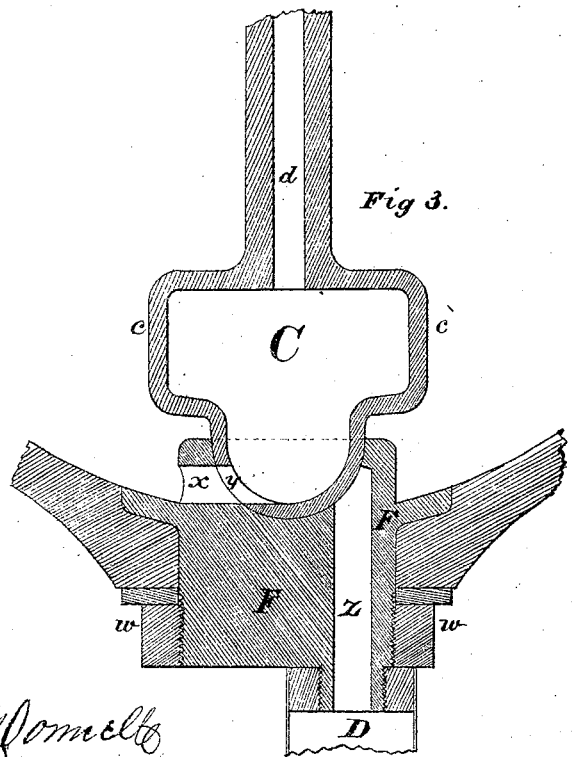

Figure 1 shows sectional view of generator with acid-chamber, acid-valve, pipe or agitator, and discharge-valve in position; Fig. 2, plan of same. Fig. 3 shows enlarged view of acid-valve and seat.

A, Fig. 1, is interior of generator; B, acid-chamber; C, acid-valve, with hollow body and stem; D, pipe attached to stem of valve-seat, through which the acid empties on soda mixture at the bottom of generator; E, funnel-shaped termination of pipe D; F, portion or stem of valve-seat passing through bottom of acid-chamber; *a a*, sides of generator; *b b*, sides of acid-chamber; *c c*, sides of acid-valve body; *d*, stem to acid-measure, tubular above the line of acid, having lateral opening at that point communicating with acid-chamber, and equalizing pressure on both, the stem, solid above, extending through stuffing-box and terminating in handle; *e e*, top of generator; *f*, cap to opening for pouring soda mixture into generator; *g g*, stuffing-box; *h h*, nut to screw down packing in same; *i i*, stops to handle *k* of acid-valve, to prevent same from making more than half-circle in its turn; *k*, handle to acid-valve; *l l*, nut through which works set-screw *m*; *m*, set-screw bearing on top of stem to acid-valve and preventing same from rising up from seat; *n n*, Fig. 1, shown more at length in Fig. 2, bolts for clamping together flanges of top of generator and body of same; *o*, cap to orifice in top of generator for filling acid-chamber; *p*, pipe connecting generator and gas-purifier; *q*, valve for discharging contents of generator; *r r*, stem of valve-seat, extending through bottom of generator, having thread on outside of same; *s*, stem of valve, having shoulder near end and terminating in thread on which works nut; *t t*, cross-piece on inside of nut *u u*, with orifice in center, through which passes end of stem to valve, the shoulder of same resting on cross-piece *t t*, while nut on end of same clamps stem and cross-piece together; *u u*, nut working on stem of valve-seat and raising valve when working upward, and closing same when working downward; *v v v*, Fig. 2, screws securing, by means of lugs through which they pass on side of acid-chamber, said chamber to top of generator, as shown in Fig. 1; *w w*, nut securing seat of acid-valve in position, and forming, by compression of bottom of acid-chamber, a perfectly tight joint; *x*, orifice in valve-seat; *y*, orifice in side of valve through which valve-body is filled when *x* and *y* are together; *z*, vertical opening in valve-seat through which acid is discharged into generator when *y* and *z* are together; *a'*, nozzle termination to nut *u u*, through which contents of generator are discharged. The top of same may be made of malleable cast-iron, with flange and all necessary lugs cast solid. The acid-chamber, being made of lead or other suitable material, may be molded with lugs on side of any shape desired. The acid-chamber, being attached to under side of top of generator and not nearer than quarter of an inch to same, allows the gas to pass unobstructed into chamber all round its circuit, and thus the necessity of a pipe, as usually attached for that purpose, is obviated. It will be readily perceived that on account of the simplicity of this arrangement a great saving in the manufacture is effected. The valve-body having only one opening for the reception and discharge of the acid, it is impossible for acid to run down into generator, no matter whether handle of valve is on one side or the other, or to the front, as may happen in old-style valve, unless care be taken to ascertain that the valve is closed. Acid-valve may be made of brass, lead, or other suitable material. If of brass, may be electroplated to prevent the acid acting on same. The valve-seat may be made of brass and also electroplated, or of soft rubber. If made of rubber the necessity of valve-stem F and nut $w$ $w$ is obviated, as rubber seats may be made with lugs to fit into recesses in bottom of the acid-chamber, while pipe D may be soldered on bottom of the acid-chamber, the valve-seat having openings $x$ and $z$, as shown in drawing. The pressure downward of acid-valve would tend to keep seat in position, and thus all leakage of acid into generator is obviated, as the only opening then necessary in the bottom of acid-chamber would be the one communicating with pipe D, and there could be no chance of a leak occurring there on account of the aforesaid pressure of the valve. The pipe, fastened to stem of valve-seat, and extending to within an inch or thereabout of bottom of generator, causes acid passing down it to fall directly on soda mixture at the bottom of same, and the rapid generation of gas in the pipe, and the impossibility of same passing upward through the valve, cause such an agitation of the contents, as the gas forces its way through the same, that a perfect displacement of the same is effected and a new portion furnished for the next lot of acid. The pipe thus proves an automatic agitator. The valve being left open above, the pressure on pipe and generator is soon equalized, and the material reaches same height in both. The effervescence taking place at bottom of generator, only a slight disturbance of the surface of mixture ensues. The acid-chamber may be rinsed with water by easing off set-screw $m$ and the stuffing-box, when the valve may be raised sufficiently to allow water to pass down pipe D, or it may be emptied by working handle of valve, as in emptying acid. A connection of presser-gauge may be made in pipe $p$, as in other apparatus, or by means of an additional lug and orifice on top of generator. A safety-valve may be attached in same manner. The contents of generator are emptied by working nut upward on valve-stem and opening valve on inside. By means of detachable pipe fitting loosely over nozzle termination of said nut and extending nearly to bottom of receiver, the contents of generator may be discharged under pressure without undue splashing.

I do not claim the right to use an acid-receptacle suspended within the generator, supported in position on tubular rod extending from top to bottom of generator, and either maintaining its position on rod or working up and down rod by means of screw and nut; nor a solid piston occupying unnecessary space inside of generator and working down into acid-receptacle and displacing acid in same until it reaches and opens drip-valve, emptying all the acid; nor a solid piston permanently affixed to tubular rod, and having movable non-rotating acid-receptacle rising on outside of same and emptying acid; nor a drip-valve, or a series of valves operated in any manner; nor a receptacle which can be tipped, so as to discharge or partially discharge its contents; nor any vessel from which the acid may be all thrown down at once. I claim no right to use a vertical pipe connecting with horizontal pipe and acid-gate or cock for delivering acid and water underneath foraminous shelf through which acid must rise to act upon alkali supported thereon. I claim no right to use an air-tight reservoir for acid, supported within the body of extinguisher by means of flange or lip of same resting on shoulder in top of body of generator or extinguisher, and requiring cap screwed on top of body to make same gas-tight, and a pipe for equalizing pressure on both. I claim no right to use an acid-jar provided with an inverted cone-shaped valve opening upward.

I claim as my invention and desire to secure by Letters Patent—

1. The stationary acid-chamber, molded of lead or any other suitable material, and of any desirable shape, with opening in bottom of lugs on outside at top, and securely affixed to under side of top of generator, with an intervening space for the equalization of pressure on generator and chamber, constructed and affixed substantially in the manner hereinbefore described.

2. The horizontally-working acid-valve, operated by handle turning it half-round and back in its seat without raising it from same, the valve-seat secured in position by nut working on end of stem to same, which forms a perfectly tight joint by compression of bottom of acid-chamber, all constructed, arranged, and operating substantially in the manner before described.

3. The leaden pipe, with funnel-shaped termination, permanently attached to end of stem to valve-seat, and extending nearly to bottom of generator, and operating substantially as herein described.

4. The discharge-valve on inside of generator, at bottom of same, constructed, affixed, and operating substantially in the manner and for the purpose before described.

J. D. O'DONNELL.

Witnesses:
Jno. Ober,
E. A. Hambright.